United States Patent
Shibata et al.

(10) Patent No.: US 10,943,561 B2
(45) Date of Patent: Mar. 9, 2021

(54) IMAGE DATA DISPLAY SYSTEM, IMAGE DATA DISPLAY METHOD, AND IMAGE DATA DISPLAY PROGRAM RECORDING MEDIUM

(71) Applicants: NEC Corporation, Tokyo (JP); TOKYO INSTITUTE OF TECHNOLOGY, Tokyo (JP)

(72) Inventors: Takashi Shibata, Tokyo (JP); Masayuki Tanaka, Tokyo (JP); Masatoshi Okutomi, Tokyo (JP)

(73) Assignees: NEC Corporation, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 16/326,556

(22) PCT Filed: Sep. 7, 2017

(86) PCT No.: PCT/JP2017/032288
§ 371 (c)(1),
(2) Date: Feb. 19, 2019

(87) PCT Pub. No.: WO2018/056065
PCT Pub. Date: Mar. 29, 2018

(65) Prior Publication Data
US 2019/0206361 A1 Jul. 4, 2019

(30) Foreign Application Priority Data
Sep. 21, 2016 (JP) .............................. JP2016-183998

(51) Int. Cl.
*G09G 5/06* (2006.01)
*G09G 5/10* (2006.01)
*G01D 7/00* (2006.01)

(52) U.S. Cl.
CPC ............... *G09G 5/06* (2013.01); *G01D 7/005* (2013.01); *G09G 5/10* (2013.01); *G09G 2320/0666* (2013.01); *G09G 2340/06* (2013.01)

(58) Field of Classification Search
CPC ............ G06T 5/50; G06T 2207/20208; G06T 5/009; G06T 2207/10024; G06T 5/002;
(Continued)

(56) References Cited

U.S. PATENT DOCUMENTS

2006/0285769 A1\* 12/2006 Wang ........................ G06T 7/13
382/274
2018/0122051 A1\* 5/2018 Li ............................. G06T 5/40

FOREIGN PATENT DOCUMENTS

| JP | 59-132340 A | 7/1984 |
| JP | 07-306666 A | 11/1995 |
| JP | 2009-216632 A | 9/2009 |

OTHER PUBLICATIONS

Bhat, Pravin, et al. "Gradientshop: A gradient-domain optimization framework for image and video filtering." ACM Transactions on Graphics (TOG) 29.2 (2010): 1-14. (Year: 2010).*
(Continued)

*Primary Examiner* — Xiao M Wu
*Assistant Examiner* — Scott E Sonners
(74) *Attorney, Agent, or Firm* — Finnegan, Henderson, Farabow, Garrett & Dunner, L.L.P.

(57) ABSTRACT

The image data display system according to the present invention makes it possible to comprehend a global distribution of measurement values and a change in details of the measurement values simultaneously. In the present invention, a color information conversion unit converts the measurement values to color information for representing the global distribution of the measurement values. A detail extraction unit extracts detail information of the measure-
(Continued)

ment values from the measurement values. A detail adjustment unit adjusts the strength of detail information and generates adjusted detail information. A color information adding unit adds color information on the basis of the adjusted detail information.

15 Claims, 9 Drawing Sheets

(58) Field of Classification Search
CPC .. G06T 5/20; G06T 5/00; G06T 5/008; G06T 2207/20192; G06T 2207/20012; G06T 5/007; G06T 2207/20008; G06T 2207/20024; G06T 7/13; G06T 7/90; G06T 2207/20028; G06T 5/005; G06T 11/001; H04N 19/186; H04N 19/98; H04N 5/2355
See application file for complete search history.

(56) References Cited

OTHER PUBLICATIONS

Hua, Miao, et al. "Edge-aware gradient domain optimization framework for image filtering by local propagation." Proceedings of the IEEE Conference on Computer Vision and Pattern Recognition. 2014. (Year: 2014).*
Fattal, Raanan, Dani Lischinski, and Michael Werman. "Gradient domain high dynamic range compression." Proceedings of the 29th annual conference on Computer graphics and interactive techniques. 2002. (Year: 2002).*
International Search Report dated Dec. 5, 2017, in corresponding PCT International Application.
Translation of the relevant part of the Written Opinion of the International Searching Authority in the corresponding PCT International Application.
Chao Zuo et al.; "Display and detail enhancement for high-dynamic-range infrared images", Optical Engineering, vol. 50, No. 12, pp. 127401-1-127401-9, (2011).
Takashi Shibata et. al.; "Gradient-Domain Image Reconstruction Framework With Intensity-Range and Base-Structure Constraints", Proceedings of the IEEE Conference on Computer Vision and Pattern Recognition, pp. 2745-2753, (2016).

* cited by examiner

IMAGE DATA DISPLAY SYSTEM, IMAGE DATA DISPLAY METHOD, AND IMAGE DATA DISPLAY PROGRAM RECORDING MEDIUM

CROSS-REFERENCE TO RELATED PATENT APPLICATIONS

This application is a National Stage Entry of International Application No. PCT/JP2017/032288, filed Sep. 7, 2017, which claims priority from Japanese Patent Application No. 2016-183998, filed Sep. 21, 2016. The entire contents of the above-referenced applications are expressly incorporated herein by reference.

TECHNICAL FIELD

The present invention relates to an image data display system, an image data display method, and an image data display program recording medium.

BACKGROUND ART

Recent development in device technology and software makes it possible to measure a measurement amount, such as temperature, a distance, and a moving vector, at high accuracy.

In such a background, in order to understand these measurements intuitively, as one of image data display methods, a method of preliminarily storing correspondence between measurement values and colors in a look-up table (LUT) and of displaying a pseudo-color using the LUT, has been widely used. Such a method of displaying a pseudo-color makes it possible to grasp a global distribution of the measurement values but it is difficult to grasp a local difference in details of the measurement values.

Non-Patent Document 1 discloses a method of displaying the local difference in the details of the measurement values by using a high-dynamic-range compression (HDR compression) technique for the measurement values.

CITATION LIST

Non Patent Literature

NPL 1: Chao Zuo, et al, "Display and detail enhancement for high-dynamic-range infrared images", Optical Engineering 50. 12 (2011): 127401-127401

NPL 2: Takashi Shibata, Masayuki Tanaka, and Masatoshi Okutomi, "Gradient-Domain Image Reconstruction Framework With Intensity-Range and Base-Structure Constraints", Proceedings of the IEEE Conference on Computer Vision and Pattern Recognition, 2016

SUMMARY OF INVENTION

Technical Problem

However, the method described in Non-Patent Document 1 is a method of displaying an image obtained by HDR compression for the measurement values as a gray image and, therefore, cannot display the image as a color image. Generally, a relationship in magnitude among the measurement values is not preserved after the HDR compression. Accordingly, there is no correlation between the measurement values and brightness values of an output image and it is impossible to intuitively grasp the global distribution of the measurement values.

It is an object of this invention to provide an image data display system which is capable of resolving the above-mentioned problems.

Solution to Problem

An aspect of this invention is an image data display system which comprises a color information conversion unit configured to convert measurement values into color information representative of a global distribution of the measurement values; a detail extraction unit configured to extract, from the measurement values, detail information of the measurement values; a detail adjustment unit configured to adjust a strength of the detail information to generate adjusted detail information; and a color information adding unit configured to add, based on the adjusted detail information, the color information.

Advantageous Effects of Invention

According to this invention, it is possible to provide an image data display system which makes it possible to simultaneously grasp a global distribution of measurement values and a detail change of the measurement values.

DESCRIPTION OF EMBODIMENTS

Now, description will be made in detail about example embodiments of this invention with reference to the drawings.

Example Embodiment 1

[Description of Configuration]

Figure 1:
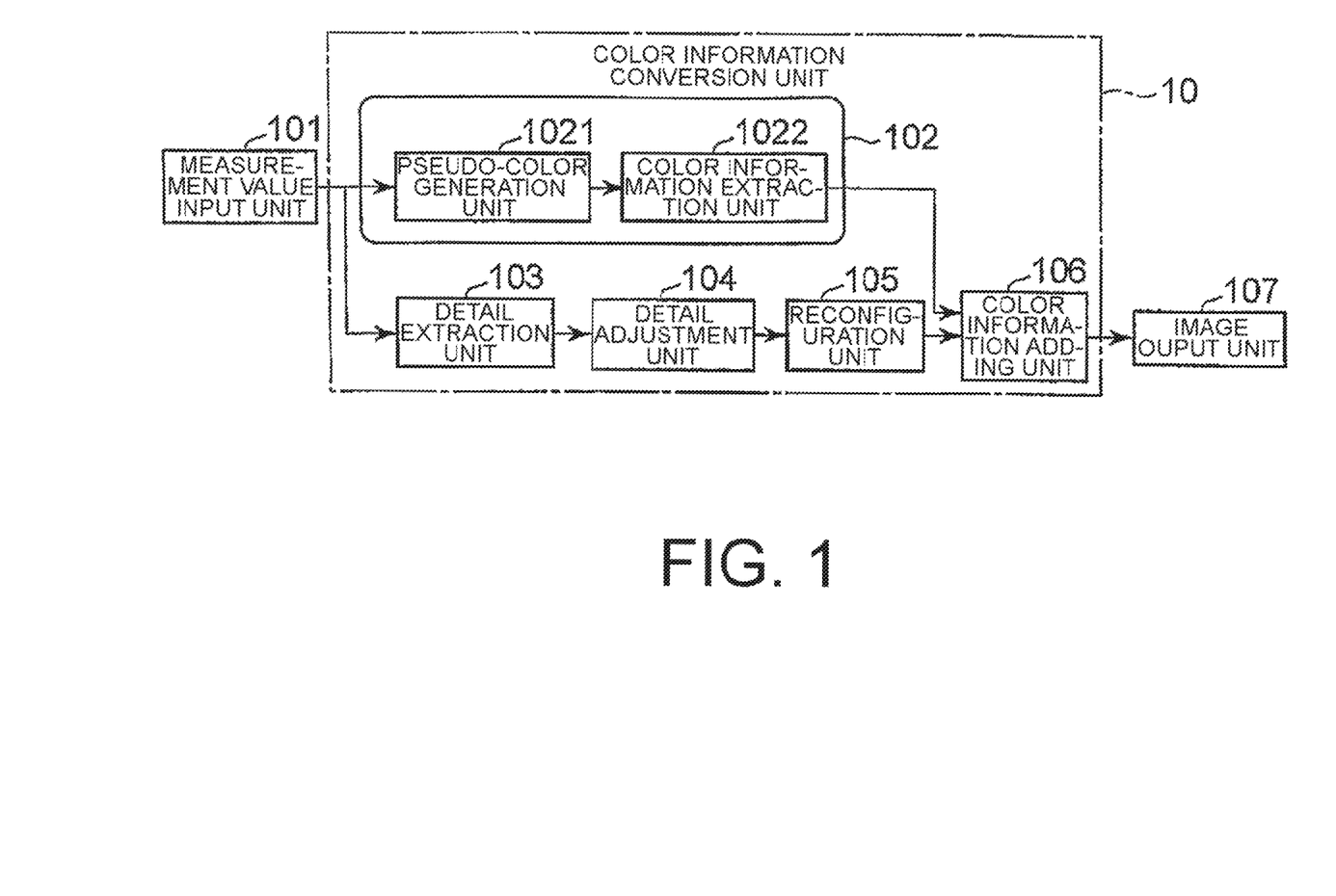
FIG. 1 is a block diagram for illustrating a configuration of an image data display system according to a first example embodiment of this invention.

FIG. 1 is a block diagram for illustrating a configuration of an image data display system according to the first example embodiment of this invention.

Referring to FIG. 1; the image data display system according to the first example embodiment of this invention includes a measurement value input unit 101, a computer 10 which operates under program control, and an image output unit 107. The computer 10 may be configured, for example, as a central processing unit, a processor, or a data processing apparatus.

The computer 10 includes a color information conversion unit 102, a detail extraction unit 103, a detail adjustment unit 104, a reconfiguration unit 105, and a color information adding unit 106. Furthermore, as shown in FIG. 1, the color information conversion unit 102 includes a pseudo-color generation unit 1021 and a color information extraction unit 1022.

Roughly, each of the above-mentioned means operates as follows.

The measurement value input unit 101 is supplied with an image and measurement values which are obtained by a camera and measurement sensors or the like. As the image and the measurement values to be supplied, a color image and images obtained by other sensors may be supplied separately. The measurement value input unit 101 records the image or the measurement values supplied thereto in a memory (not shown) or the like.

The image output unit 107 is an output device for outputting a color image generated by the color information adding unit 106 which will later be described. The image output unit 107 is implemented by, for example, a display device or the like.

The color information conversion unit 102 converts the measurement values supplied from the measurement value input unit 101 into color information representative of a global distribution of the measurement values. As described above, the color information conversion unit 102 includes the pseudo-color generation unit 1021 and the color information extraction unit 1022. The pseudo-color generation unit 1021 generates, based on the measurement values supplied from the measurement value input unit 101, a pseudo-color for each pixel. As a method of generating the pseudo-color, for example, a correspondence between the measurement values and colors is preliminarily stored in a look-up table (LUT) and the pseudo-color is directly generated using the LUT storing the correspondence. Furthermore, the color information extraction unit 1022 extracts color information from the pseudo-color generated by the pseudo-color generation unit 1021. As a method of extracting the color information, for example, CrCb components or the like may be extracted from the pseudo-color.

The detail extraction unit 103 extracts detail information of the measurement values from the measurement values supplied from the measurement value input unit 101. As a method of extracting the detail information of the measurement values, for example, the measurement values are assigned to lightness and a gradient of the assigned lightness is extracted as the detail information.

The detail adjustment unit 104 compresses the detail information extracted by the detail extraction unit 103 so as to preserve a change in details, thereby generating adjusted detail information. Description will be made, for example, about a case where the detail information includes the gradient. In this case, as a method of generating the adjusted detail information, the gradient may be subjected to, uniformly for each pixel, linear conversion (e.g. the gradient is multiplied by several times uniformly) or nonlinear conversion (e.g. the gradient is subjected to gamma correction uniformly).

The reconfiguration unit 105 reconfigures the lightness based on the adjusted detail information generated by the detail adjustment unit 104. For example, in a case where the adjusted detail information includes the gradient, the reconfiguration unit 105 may reconfigure the lightness by integrating the gradient. Furthermore, the reconfiguration unit 105 may reconfigure the lightness by using, for example, a method described in Non-Patent Document 2.

The color information adding unit 106 adds the color information converted by the color information conversion unit 102 to the lightness reconfigured by the reconfiguration unit 105. As a specific method of adding the color information, for example, the lightness reconfigured by the reconfiguration unit 105 is represented as a Y component, the color information converted by the color information conversion unit 102 is represented as CrCb components, and those components are converted into RGB components, thus adding the color information. Alternatively, the color information adding unit 106 may generate an output image, for example, by separating the pseudo-color of the measurement values generated by the pseudo-color generation unit 1021 into lightness, saturation, and a hue and by replacing the lightness of the pseudo-color with the lightness obtained by the reconfiguration unit 105.

[Description of Operation]

Figure 2:
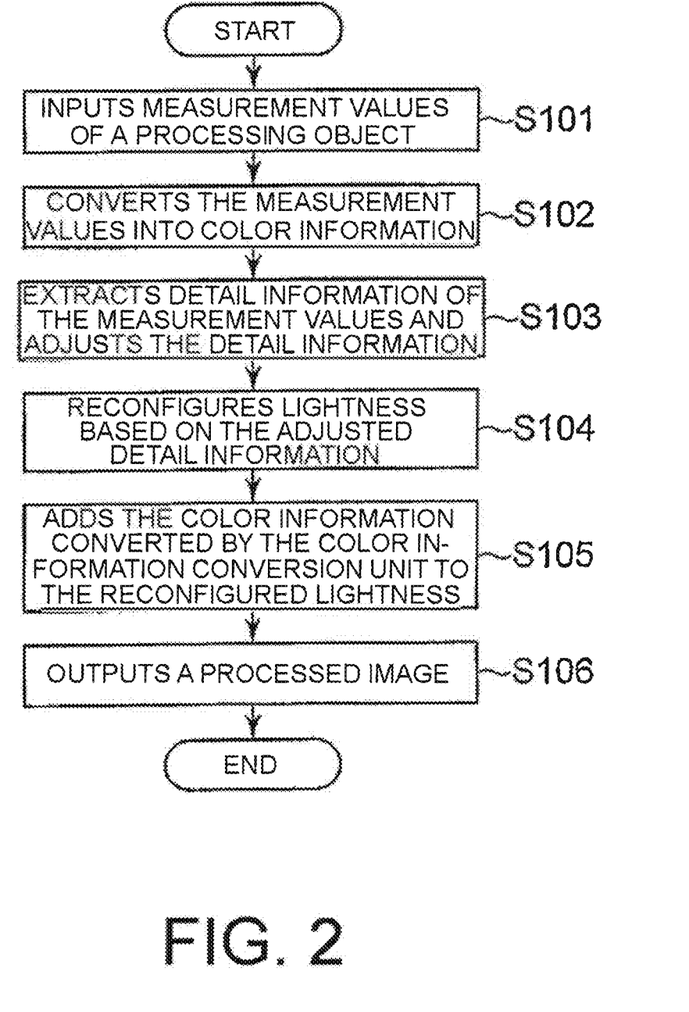
FIG. 2 is a flow chart for use in explaining an operation in the image data display system illustrated in FIG. 1.

Next referring to a flow chart of FIG. 2, description will be made in detail about a whole operation of the image data display system according to the first example embodiment.

First of all, the measurement value input unit 101 inputs measurement values as a processing object (step S101). Subsequently, the color information conversion unit 102 converts the measurement values to color information (step S102). Furthermore, the detail extraction unit 103 extracts detail information of the measurement values and then the detail adjustment unit 104 adjusts the detail information (step S103).

Next, the reconfiguration unit 105 reconfigures lightness based on the adjusted detail information (step S104). Furthermore, the color information adding unit 106 adds the color information converted by the color information conversion unit 102 to the lightness reconfigured by the reconfiguration unit 105 (step S105). Finally, the image output unit 107 outputs a processed image (step S106).

[Description of Effect]

Next, an effect of the first example embodiment will be described.

According to the first example embodiment, it is possible to generate a color image which makes it possible to simultaneously grasp the global distribution of the measurement values and a detail change of the measurement values. This is because the color information obtained by the color information conversion unit 102 includes information related to the global distribution of the measurement values while the lightness reconfigured by the reconfiguration unit 105 includes the detail information of the measurement values.

The effect of the first example embodiment of the present invention will be described more in detail by using FIG. 9.

Figure 9:
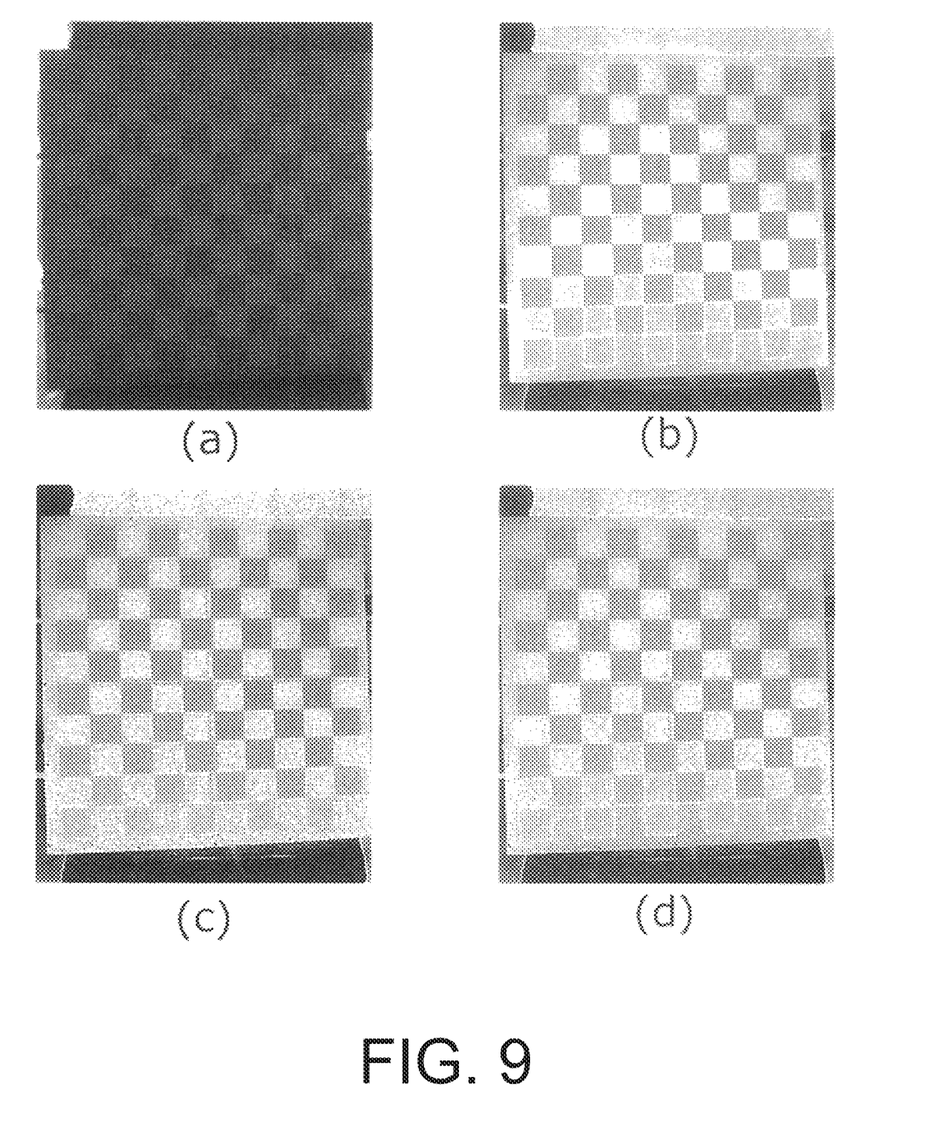
FIG. 9 is a view for illustrating an effect of the image data display system according to the example embodiments of this invention.

FIG. 9(a) is a view representing the measurement values supplied from the measurement value input unit 101 by using brightness values. FIG. 9(b) is a view visualizing the color information converted by the color information conversion unit 102. FIG. 9(c) is a view representing the measurement values reconfigured by the reconfiguration unit 105 as brightness values. FIG. 9(d) is a view showing an output image generated by the color information adding unit 106.

In comparison with FIG. 9(a), by integrating the global distribution shown in FIG. 9(b) with the detail information shown in FIG. 9(c), it is possible to simultaneously grasp the global distribution and the detail information as shown in FIG. 9(d).

Respective parts of the image data display system may be implemented by using a combination of hardware and software. In a form in which the hardware and the software are combined, the respective parts are implemented as various kinds of means by deploying an image data display program in a RAM (random access memory) and making the hardware, such as a control unit (CPU (central processing unit)) or the like, operate based on the image data display program. The image data display program may be recorded in a recording medium to be distributed. The image data display program recorded in the recording medium is read into a memory via a wire, wirelessly, or via the recording medium itself to operate the control unit and so on. By way of example, the recording medium may be an optical disc, a magnetic disk, a semiconductor memory device, a hard disk, or the like.

Explaining the above-mentioned first example embodiment with different expression, it is possible to implement the embodiment by making a computer to be operated as the image data display system act as the color information conversion unit 102, the detail extraction unit 103, the detail adjustment unit 104, the reconfiguration unit 105, and color information adding unit 106 according to the image data display program deployed on the RAM.

Example Embodiment 2

[Description of Configuration]

Figure 3:
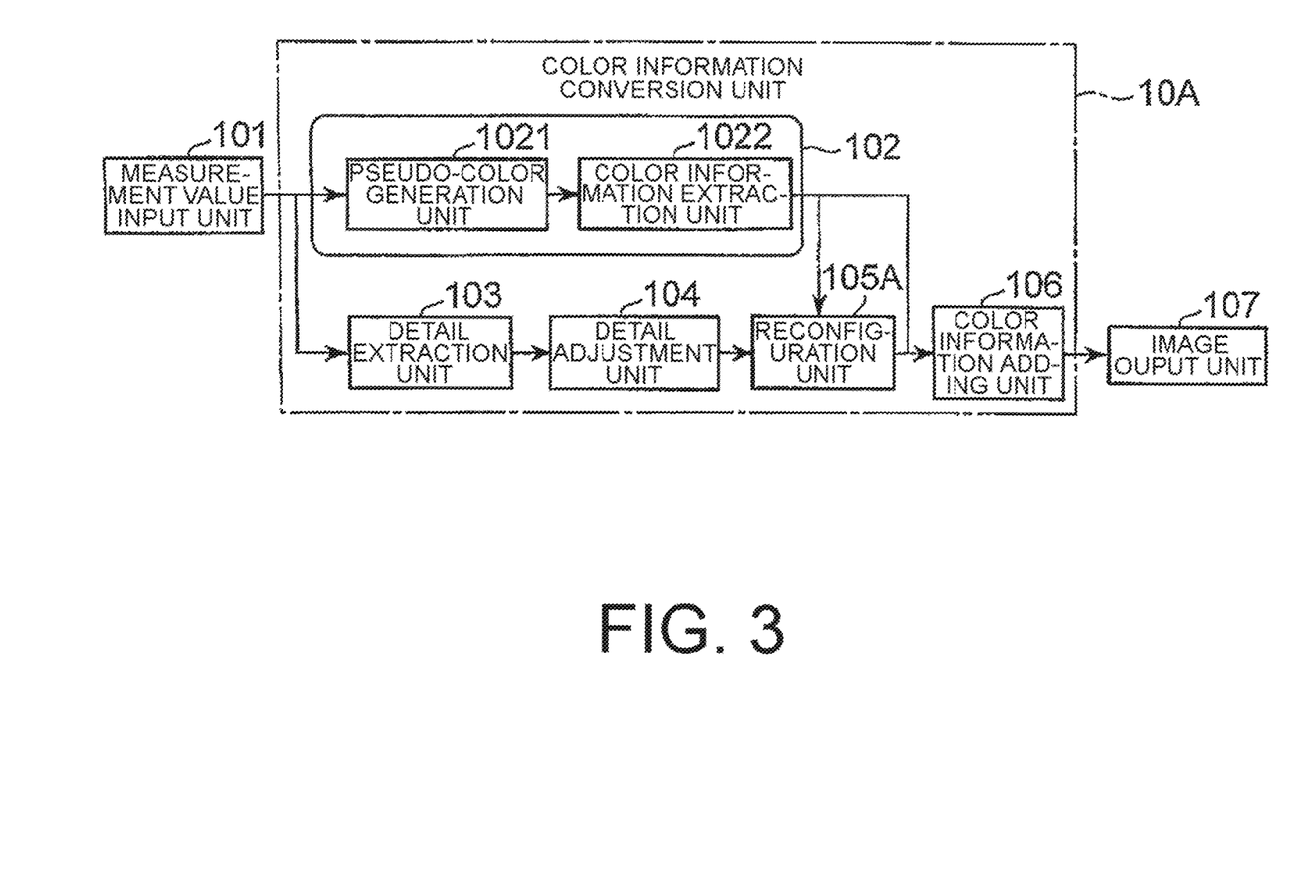
FIG. 3 is a block diagram for illustrating a configuration of an image data display system according to a second example embodiment of this invention.

FIG. 3 is a block diagram for illustrating a configuration of an image data display system according to a second example embodiment of this invention.

The illustrated image data display system is similar in structure and operation to the image data display system illustrated in FIG. 1 except that a configuration of the computer is different as will be described hereunder. The computer is therefore depicted by a reference numeral 10A. The computer 10A may also be configured, for example, as a central processing unit, a processor, or a data processing apparatus.

The computer 10A is similar in structure and operation to the computer 10 illustrated in FIG. 1 except that an operation of the reconfiguration unit is different as will be described hereunder. The reconfiguration unit is therefore depicted by a reference numeral 105A. Same reference numerals are assigned to parts similar in function to those in FIG. 1, and the description thereof is omitted for the sake of simplification of the description.

The reconfiguration unit 105A reconfigures the lightness from the color information converted by the color information conversion unit 102 and the adjusted detail information obtained by the detail adjustment unit 104. As a method of reconfiguring the lightness from the color information converted by the color information conversion unit 102 and the adjusted detail information obtained by the detail adjustment unit 104, for example, following methods may be adopted. The lightness may be reconfigured with a range of the lightness restricted so that saturation and a hue of the pseudo-color generated by the pseudo-color generation unit 1021, and UV components in a YUV color space are preserved as the color information. In a case where ab components in a Lab color space is used, the lightness may be reconfigured with the range of the lightness restricted so that the saturation and the hue, the UV components, or the ab components are preserved.

More specifically, a method of restricting the range of the lightness based on the color information will be described as regards, by way of example, a case where the ab components in the Lab color space are used as the color information.

First, the reconfiguration unit 105A discretely samples the lightness into plural sampled values for each pixel and, using the sampled values of the lightness as an L component and the values obtained by conversion at the color information conversion unit 102 as ab components, calculates pixel values in the Lab color space. Subsequently, the reconfiguration unit 105A converts the pixel values in the Lab color space into pixel values in an RGB color space. When the pixel values in the RGB color space, namely, each component of RGB does not exceed to a predetermined range (between 0 and 255 in a case of the image of eight bits), the reconfiguration unit 105A decides that the color information (e.g. the ab components) is preserved. The reconfiguration unit 105A carries out such a decision for all of the sampled lightness, and generates the range consisting of the lightness for which it is decided that the color information (e.g. the ab components) is preserved. Within the obtained range, the reconfiguration unit 105A may reconfigure the lightness based on the adjusted detail information obtained by the detail adjustment unit 104.

[Description of Operation]

Figure 4:
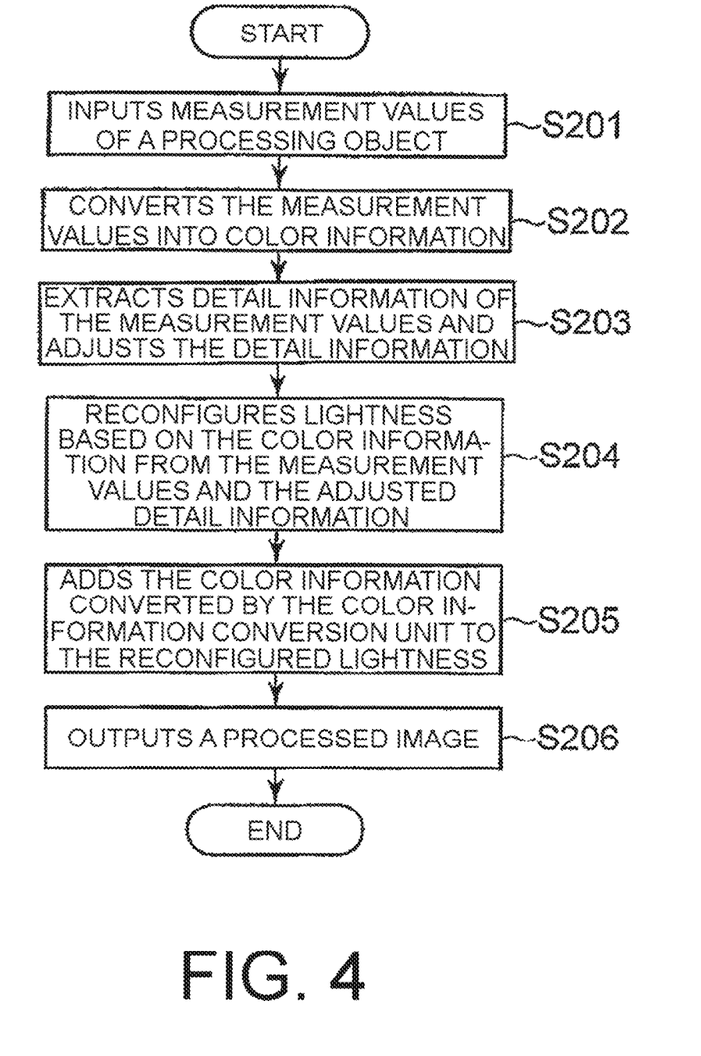
FIG. 4 is a flow chart for use in explaining an operation in the image data display system illustrated in FIG. 3.

Referring to a flow chart of FIG. 4, description will be made in detail about a whole operation of the image data display system according to the second example embodiment.

First of all, the measurement value input unit 101 inputs measurement values as a processing object (step S201). Subsequently, the color information conversion unit 102 converts the measurement values into color information (step S202). Furthermore, the detail extraction unit 103 extracts detail information of the measurement values and then the detail adjustment unit 104 adjusts the detail information (step S203).

Next, the reconfiguration unit 105A reconfigures lightness based on the color information obtained from the measurement values and the adjusted detail information (step S204). Furthermore, the color information adding unit 106 adds the color information converted by the color information conversion unit 102 to the lightness reconfigured by the reconfiguration unit 105A (step S205). Finally, the image output unit 107 outputs a processed image (step S206).

[Description of Effect]

Next, an effect of the second example embodiment will be described.

According to the second example embodiment, it is possible to express, at high accuracy, the color information for representing a global distribution of measurement values. This is because the reconfiguration unit 105A reconfigures the lightness for containing the detail information of the measurement values within the range consisting of the lightness for which it is decided that the color information is preserved, and then the color information adding unit 106 can generate a color image in which the color information converted by the color information conversion unit 102 is preserved.

Respective parts of the image data display system may be implemented by using a combination of hardware and software. In a form in which the hardware and the software are combined, the respective parts are implemented as various kinds of means by deploying an image data display program in a RAM (random access memory) and making the hardware, such as a control unit (CPU (central processing unit)) or the like, operate based on the image data display program. The image data display program may be recorded in a recording medium to be distributed. The image data display program recorded in the recording medium is read into a memory via a wire, wirelessly, or via the recording medium itself to Operate the control unit and so on. By way of example, the recording medium may be an optical disc, a magnetic disk, a semiconductor memory device, a hard disk, or the like.

Explaining the above-mentioned second example embodiment with different expression, it is possible to implement the embodiment by making a computer to be operated as the image data display system act as the color information conversion unit 102, the detail extraction unit 103, the detail adjustment unit 104, the reconfiguration unit 105A, and the color information adding unit 106 according to the image data display program deployed on the RAM.

Example Embodiment 3

[Description of Configuration]

Figure 5:
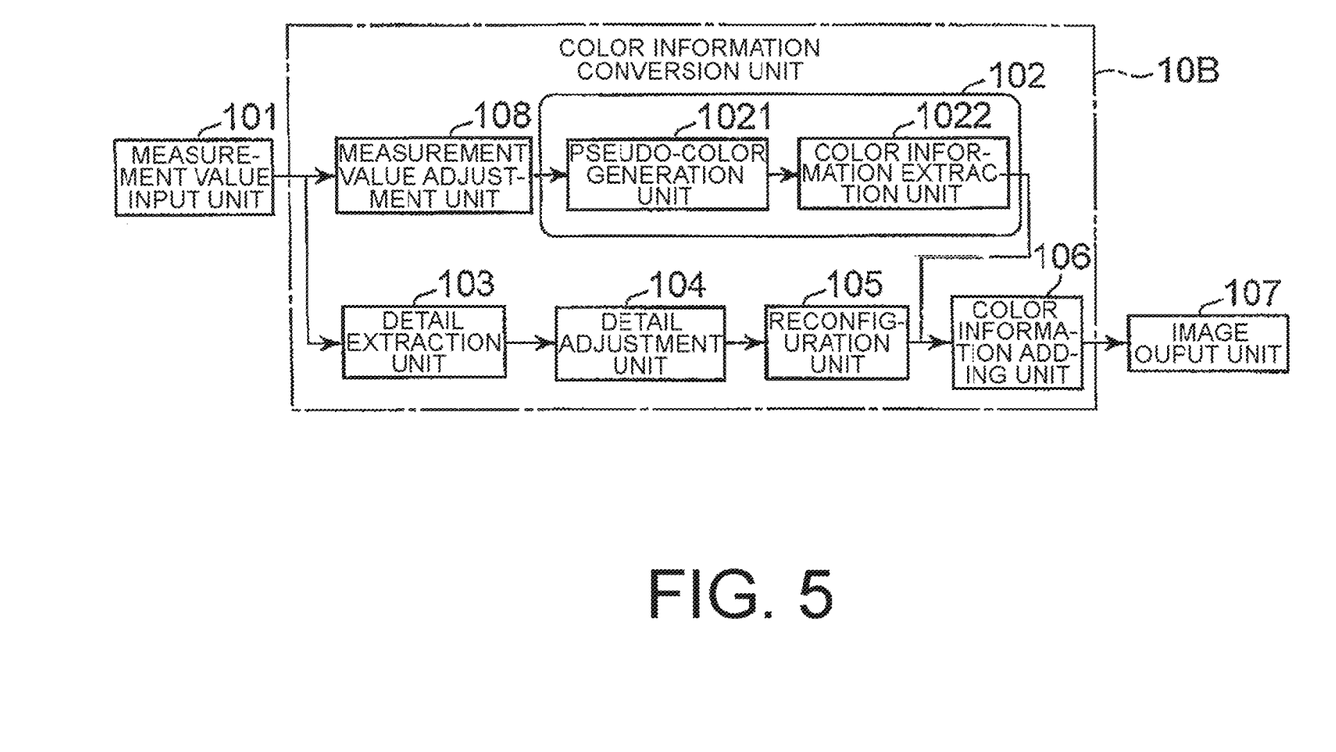
FIG. 5 is a block diagram for illustrating a configuration of an image data display system according to a third example embodiment of this invention.

FIG. 5 is a block diagram for illustrating a configuration of an image data display system according to a third example embodiment of this invention.

The illustrated image data display system is similar in structure and operation to the image data display system illustrated in FIG. 1 except that a configuration of the computer is different as will be described hereunder. The computer is therefore depicted by a reference numeral 10B. The computer 10B may also be configured, for example, as a central processing unit, a processor, or a data processing apparatus.

The computer 10B is similar in structure and operation to the computer 10 illustrated in FIG. 1 except that the computer 10B further includes a measurement value adjustment unit 108. Same reference numerals are assigned to parts similar in function to those in FIG. 1, and the description thereof is omitted for the sake of simplification of the description.

The measurement value adjustment unit 108 converts the measurement values supplied from the measurement value input unit 101 into more appropriate values to generate adjusted measurement values. As a specific method of converting the measurement values, for example, the whole image may be multiplied by the same monotonically increasing function (e.g. a gamma curve or the like) in order to adjust a tone in the whole image before the pseudo-color generation unit 1021 generates the pseudo-color, it is noted that the method of converting the measurement values is not limited thereto. For example, the measurement value adjustment unit 108 may multiply the measurement values by a monotonically increasing function (e.g. an S-shaped curve or the like) so as to improve resolution around a concerned value among the measurement values.

The color information conversion unit 102 converts the adjusted measurement values from the measurement value adjustment unit 108 into the color information.

[Description of Operation]

Figure 6:
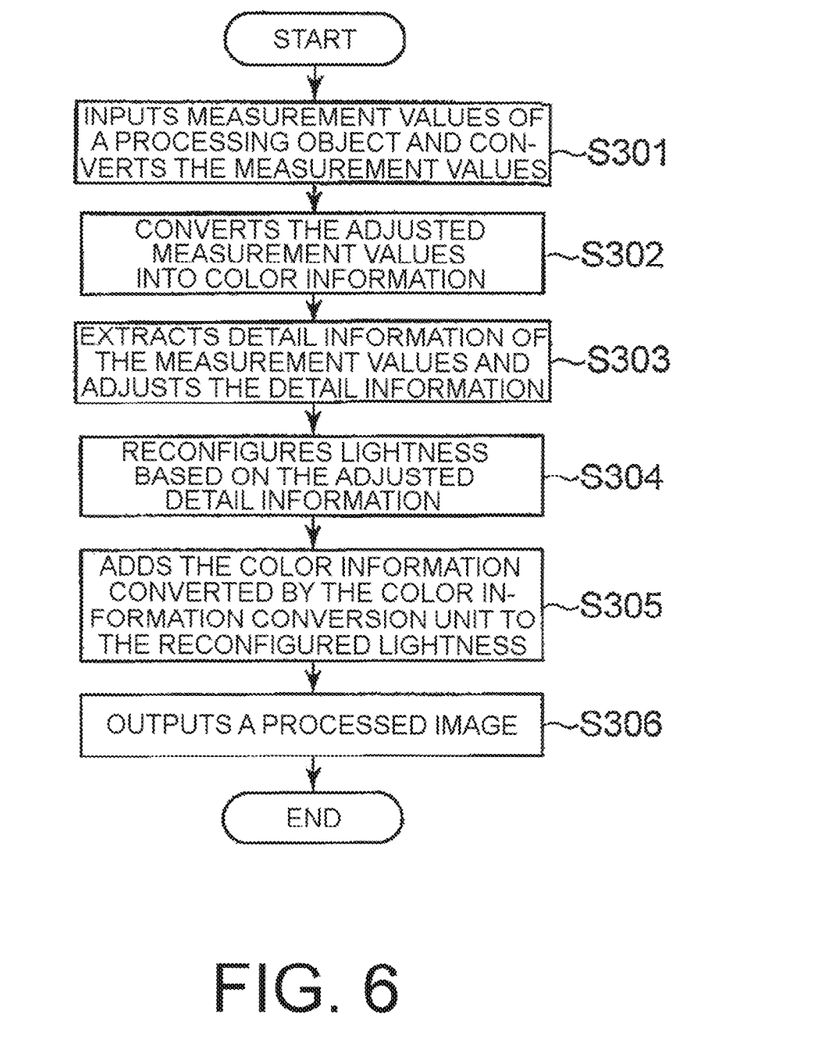
FIG. 6 is a flow chart for use in explaining an operation in the image data display system illustrated in FIG. 5.

Next referring to a flow chart of FIG. 6, description will be made in detail about a whole operation of the image data display system according to the third example embodiment.

First of all, the measurement value input unit 101 inputs measurement values as a processing object and the measurement value adjustment unit 108 converts the input measurement values into the more appropriate values (step S301). Subsequently, the color information conversion unit 102 converts the adjusted measurement values into color information (step S302). Furthermore, the detail extraction unit 103 extracts detail information of the measurement values and then the detail adjustment unit 104 adjusts the detail information (step S303).

Next, the reconfiguration unit 105 reconfigures lightness based on the adjusted detail information (step S304). Furthermore, the color information adding unit 106 adds the color information converted by the color information conversion unit 102 to the lightness reconfigured by the reconfiguration unit 105 (step S305). Finally, the image output unit 107 outputs a processed image (step S306).

[Description of Effect]

Next, an effect of the third example embodiment will be described.

According to the third example embodiment, it is possible to express, as the more appropriate values for a user, the color information used for representing the global distribution of the measurement values. This is because the measurement value adjustment unit 108 coverts the measurement values supplied from the measurement value input unit 101 into the more appropriate values to generate the adjusted measurement values.

Respective parts of the image data display system may be implemented by using a combination of hardware and software. In a form in which the hardware and the software are combined, the respective parts are implemented as various kinds of means by deploying an image data display program in a RAM (random access memory) and making the hardware, such as a control unit (CPU (central processing unit)) or the like, operate based on the image data display program. The image data display program may be recorded in a recording medium to be distributed. The image data display program recorded in the recording medium is read into a memory via a wire, wirelessly, or via the recording medium itself to operate the control unit and so on. By way of example, the recording medium may be an optical disc, a magnetic disk, a semiconductor memory device, a hard disk, or the like.

Explaining the above-mentioned third example embodiment with different expression, it is possible to implement the embodiment by making a computer to be operated as the image data display system act as the measurement value adjustment unit 108, the color information conversion unit 102, the detail extraction unit 103, the detail adjustment unit 104, the reconfiguration unit 105, and the color information adding unit 106 according to the image data display program deployed on the RAM.

Example Embodiment 4

[Description of Configuration]

Figure 7:
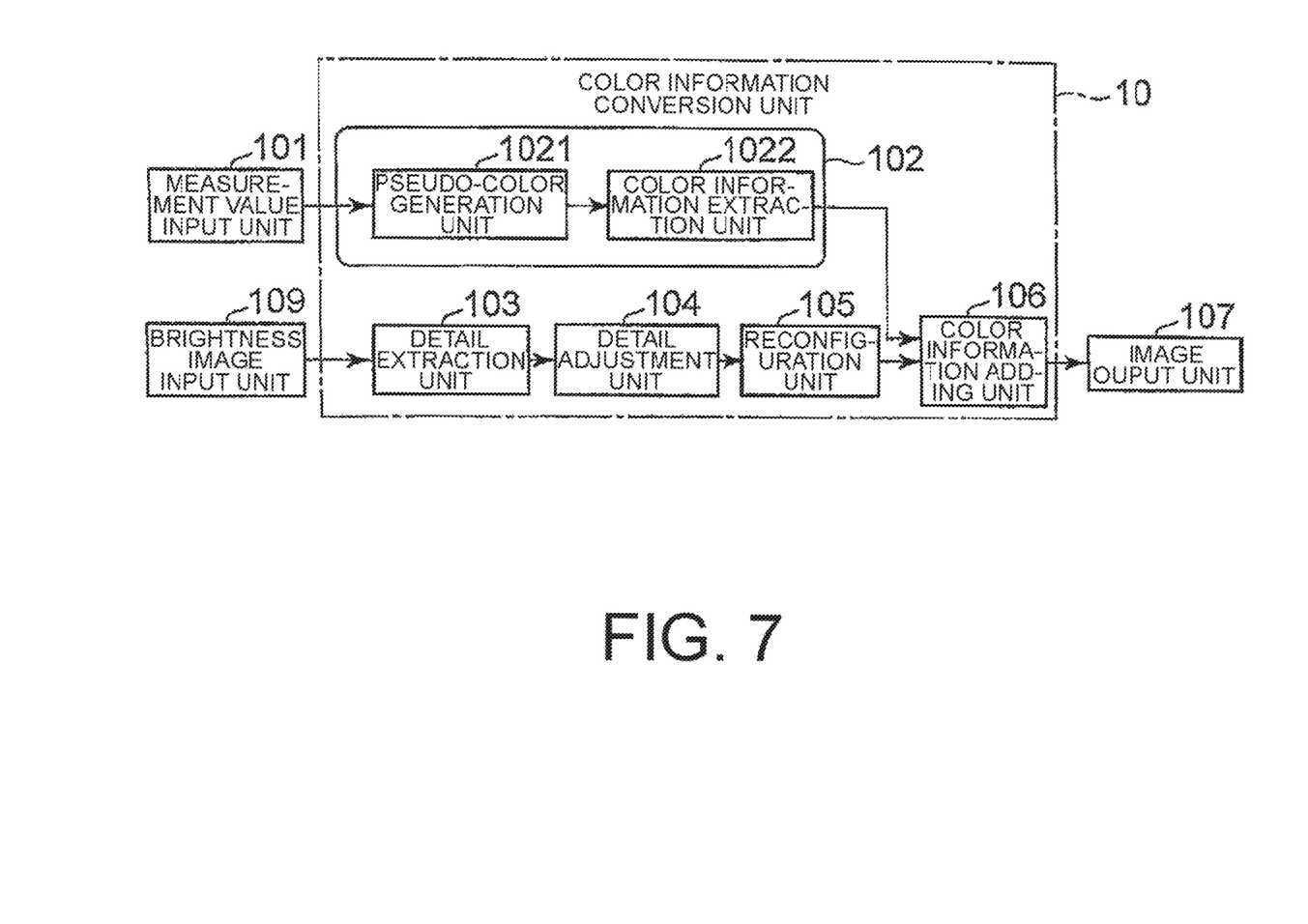
FIG. 7 is a block diagram for illustrating a configuration of an image data display system according to a fourth example embodiment of this invention.

FIG. 7 is a block diagram for illustrating a configuration of an image data display system according to a fourth example embodiment of this invention.

The illustrated image data display system is similar in structure and operation to the image data display system illustrated in FIG. 1 except that the image data display system further includes a brightness image input unit 109. Same reference numerals are assigned to parts similar in function to those in FIG. 1, and the description thereof is omitted for the sake of simplification of the description.

The brightness image input unit 109 inputs a brightness image related to the measurement values supplied from the measurement value input unit 101. For example, if the measurement values supplied from the measurement Value input unit 101 are temperature, the related brightness image may be a brightness image in a case where the same scene is shot by a visible light camera. Alternatively, the brightness image input unit 109 may use a depth image shot by a depth camera or a near-infrared image shot by a near-infrared camera in lieu of the brightness image shot by the visible light camera.

The detail extraction unit 103 extracts detail information of the brightness image.

[Description of Operation]

Figure 8:
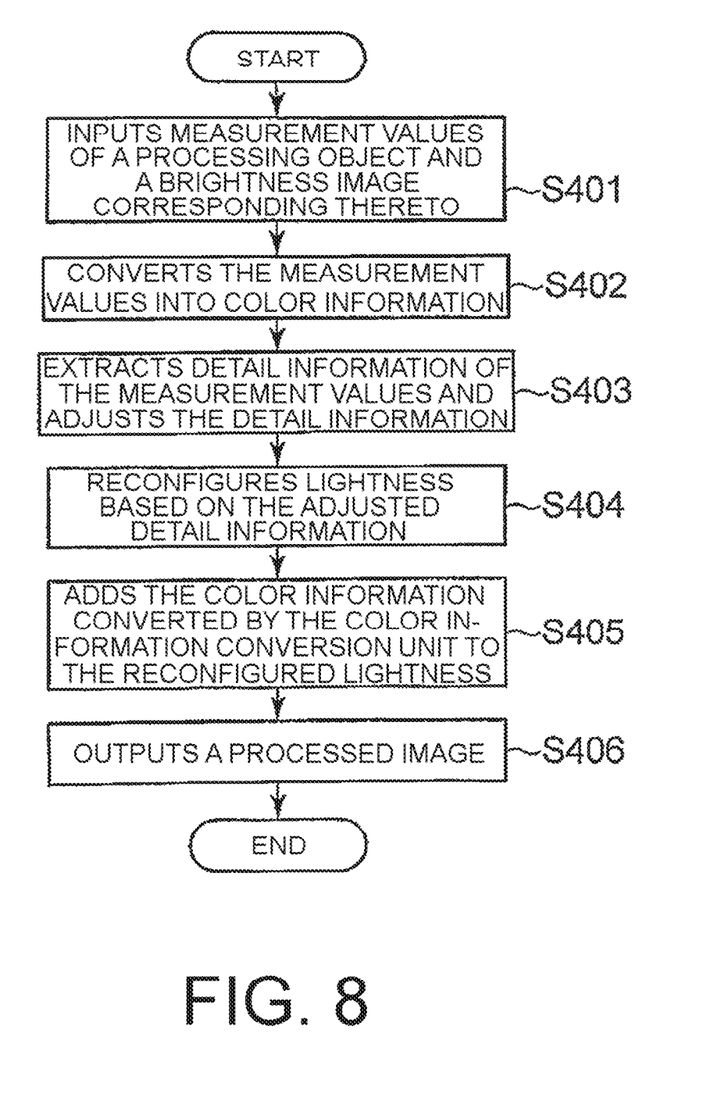
FIG. 8 is a flow chart for use in explaining an operation in the image data display system illustrated in FIG. 7.

Next referring to a flow chart of FIG. 8, description will be made in detail about a whole operation of the image data display system according to the fourth example embodiment.

First of all, the measurement value input unit 101 inputs measurement values as a processing object and the brightness image input unit 109 inputs a brightness image corresponding thereto (step S401). Subsequently, the color information conversion unit 102 converts the measurement values into color information (step S402). Furthermore, the detail extraction unit 103 extracts detail information of the brightness image and then the detail adjustment unit 104 adjusts the detail information (step S403).

Next, the reconfiguration unit 105 reconfigures lightness based on the adjusted detail information (step S404). Furthermore, the color information adding unit 106 adds the color information converted by the color information conversion unit 102 to the lightness reconfigured by the reconfiguration unit 105 (step S405). Finally, the image output unit 107 outputs a processed image (step S406).

[Description of Effect]

Next, an effect of the fourth example embodiment will be described.

According to the fourth example embodiment, it is possible to generate a color image which makes it possible to simultaneously grasp the global distribution of the measurement values and the detail information of the brightness image. This is because the brightness image input unit 109 inputs the brightness image related to the measurement values supplied from the measurement value input unit 101 and the color information adding unit 106 generates the color image using the detail information of the brightness image and the color information obtained from the measurement values.

This invention is not strictly limited to the specific configurations of the above-mentioned example embodiments, and this invention involves any changes in a range not departing from the gist of this invention.

While the present invention has been described with reference to the example embodiments thereof, the present invention is not limited to the foregoing example embodiments. The configuration and the details of this invention may be modified within the scope of this invention in various manners which could be understood by those of ordinary skill.

A part or a whole of the example embodiments disclosed above may also be described by, but are not limited to, the following supplementary notes.

(Supplementary Note 1)

An image data display system comprising a color information conversion unit configured to convert measurement values into color information representative of a global distribution of the measurement values; a detail extraction unit configured to extract, from the measurement values, detail information of the measurement values; a detail adjustment unit configured to adjust a strength of the detail information to generate adjusted detail information; and a color information adding unit configured to add, based on the adjusted detail information, the color information.

(Supplementary Note 2)

The image data display system according to Supplementary Note 1, wherein the color information conversion unit comprises a pseudo-color generation unit configured to generate, based on the measurement values, a pseudo-color for each pixel; and a color information extraction unit configured to extract the color information from the pseudo-color.

(Supplementary Note 3)

The image data display system according to Supplementary Note 1 or 2, wherein the image data display system further comprises a reconfiguration unit configured to reconfigure lightness based on the adjusted detail information, and wherein the color information adding unit is configured to add the color information to the reconfigured lightness.

(Supplementary Note 4)

The image data display system according to Supplementary Note 3, wherein the reconfiguration unit is configured to reconfigure, based on the color information and the adjusted detail information, the lightness so as to preserve the color information.

(Supplementary Note 5)

The image data display system according to any one of Supplementary Notes 1 to 4, wherein the image data display system further comprises a measurement value adjustment unit configured to convert the measurement values to more appropriate values to generate adjusted measurement values, and wherein the color information conversion unit is configured to convert the adjusted measurement values to the color information.

(Supplementary Note 6)

The image data display system according to any one of Supplementary Notes 1 to 5, wherein the image data display system further comprises a brightness image input unit configured to input a brightness image related to the measurement values, and wherein the detail extraction unit is configured to extract, based on the brightness image instead of the measurement values, detail information of the brightness image.

(Supplementary Note 7)

An image data display method comprising a color information conversion step of converting, in a color information conversion unit, measurement values into color information representative of a global distribution of the measurement values; a detail extraction step of extracting, in a detail extracting unit, detail information of the measurement values based on the measurement values; a detail adjustment step of adjusting, in a detail adjustment unit, a strength of the detail information to generate adjusted detail information, and a color information adding step of adding, in a color information adding unit, the color information based on the adjusted detail information.

(Supplementary Note 8)

The image data display method according to Supplementary Note 7, wherein the color information conversion step comprises a pseudo-color generation step of generating, in a pseudo-color generation unit, a pseudo-color for each pixel based on the measurement values; and a color information extraction step of extracting, in a color information extraction unit, the color information from the pseudo-color.

(Supplementary Note 9)

The image data display method according to Supplementary Note 7 or 8, further comprising a reconfiguration step of reconfiguring, in a reconfiguration unit, lightness from the adjusted detail information, wherein, in the color information adding step, the color information adding unit adds the color information to the reconfigured lightness.

(Supplementary Note 10)

The image data display method according to Supplementary Note 9, wherein, in the reconfiguration step, the reconfiguration unit reconfigures the lightness based on the color information and the adjusted detail information so as to preserve the color information.

(Supplementary Note 11)

The image data display method according to any one of Supplementary Notes 7 to 10, further comprising a measurement value adjustment step of generating, in a measurement value adjustment unit, adjusted measurement values by conversion of the measurement values into more appropriate values, wherein, in the color information conversion step, the color information conversion unit converts the adjusted measurement values into the color information.

(Supplementary Note 12)

The image data display method according to any one of Supplementary Notes 7 or 11, further comprising a brightness image input step of inputting, in a brightness image input unit, a brightness image related to the measurement values, wherein, in the detail extraction step, the detail extraction unit extracts, from the brightness image, detail information of the brightness image.

(Supplementary Note 13)

An image data display program recording medium recording an image data display program for causing a computer to execute a color information conversion procedure for converting measurement values into color information representative of a global distribution of the measurement values; a detail extraction procedure for extracting, from the measurement values, detail information of the measurement values;

a detail adjustment procedure for adjusting a strength of the detail information to generate adjusted detail information; and a color information adding procedure for adding, based on the adjusted detail information, the color information.

(Supplementary Note 14)

The image data display program recording medium according to Supplementary Note 13, wherein the color information conversion procedure causes the computer to execute a pseudo-color generation procedure for generating, based on the measurement values, a pseudo-color for each pixel; and a color information extraction procedure for extracting the color information from the pseudo-color.

(Supplementary Note 15)

The image data display program recording medium according to Supplementary Note 13 or 14, wherein the image data display program further causes the computer to execute a reconfiguration procedure for reconfiguring lightness based on the adjusted detail information, and wherein the color information adding procedure causes the computer to add the color information to the reconfigured lightness.

(Supplementary Note 16)

The image data display program recording medium according to Supplementary Note 15, wherein the reconfiguration procedure causes the computer to reconfigure, based on the color information and the adjusted detail information, the lightness so as to preserve the color information.

(Supplementary Note 17)

The image data display program recording medium according to any one of Supplementary Notes 13 to 16, wherein the image data display program further causes the computer to execute a measurement value adjustment procedure for converting the measurement values to more appropriate values to generate adjusted measurement values, and wherein the color information conversion procedure causes the computer to convert the adjusted measurement values to the color information.

(Supplementary Note 18)

The image data display program recording medium according to any one of Supplementary Notes 13 to 17, wherein the image data display program further causes the computer to execute a brightness image input procedure for inputting a brightness image related to the measurement values, and wherein the detail extraction procedure causes the computer to extract, based on the brightness image instead of the measurement values, detail information of the brightness image.

While the present invention has been described with reference to the example embodiments thereof, the present invention is not limited to the foregoing example embodiments. The configuration and the details of this invention may be modified within the scope of this invention in various manners which could be understood by those of ordinary skill.

REFERENCE SIGNS LIST 10, 10A, 10B computer (central processing unit; processor; data processing apparatus)
101 measurement value input unit
102 color information conversion unit
1021 pseudo-color generation unit
1022 color information extraction unit
103 detail extraction unit
104 detail adjustment unit
105, 105A reconfiguration unit
106 color information adding unit
107 image output unit
108 measurement value adjustment unit
109 brightness image input unit This application is based upon and claims the benefit of priority from Japanese patent application No. 2016-183998, filed on Sep. 21, 2016, the disclosure of which is incorporated herein in its entirety by reference.

The invention claimed is:

1. An image data display system comprising:
a color information convertor configured to convert measurement values into color information representative of a global distribution of the measurement values;
a detail extractor configured to extract, from the measurement values, detail information of the measurement values, the detail extractor being configured to assign the measurement values to lightness and to extract a gradient of the assigned lightness as the detail information;
a detail adjustor configured to adjust a strength of the detail information to generate adjusted detail information;
a reconfigurator configured to reconfigure, based on the adjusted detail information, the lightness by integrating the gradient; and
a color information adder configured to add, based on the adjusted detail information, the color information to the reconfigured lightness.

2. The image data display system as claimed in claim 1, wherein the color information convertor comprises:
a pseudo-color generator configured to generate, based on the measurement values, a for each pixel; and
a color information extractor configured to extract the color information from the pseudo-color.

3. The image data display system as claimed in claim 1, wherein the reconfigurator is configured to reconfigure, based on the color information and the adjusted detail information, the lightness so as to preserve the color information.

4. The image data display system as claimed in claim 1,
wherein the image data display system further comprises a measurement value adjustor configured to convert the measurement values to more appropriate values to generate adjusted measurement values, and
wherein the color information convertor is configured to convert the adjusted measurement values to the color information.

5. The image data display system as claimed in claim 1,
wherein the image data display system further comprises a brightness image inputter configured to input a brightness image related to the measurement values, and
wherein the detail extractor is configured to extract, based on the brightness image instead of the measurement values, detail information of the brightness image.

6. An image data display method comprising:
converting measurement values into color information representative of a global distribution of the measurement values;
extracting detail information of the measurement values based on the measurement values, wherein the extracting assigns the measurement values to lightness and extracts a gradient of the assigned lightness as the detail information;
adjusting a strength of the detail information to generate adjusted detail information;
reconfiguring, based on the adjusted detail information, the lightness by integrating the gradient; and
adding, based on the adjusted detail information, the color information to the reconfigured lightness.

7. The image data display method as claimed in claim 6, wherein the converting comprises:
generating a pseudo-color for each pixel based on the measurement values; and
extracting the color information from the pseudo-color.

8. The image data display method as claimed in claim 6, wherein the reconfiguring reconfigures the lightness based on the color information and the adjusted detail information so as to preserve the color information.

9. The image data display method as claimed in claim 6, further comprising:
generating adjusted measurement values by conversion of the measurement values into more appropriate values;
wherein the converting converts the adjusted measurement values into the color information.

10. The image data display method as claimed in claim 6, further comprising:
inputting a brightness image related to the measurement values,
wherein the extracting detail information extracts, from the brightness image, detail information of the brightness image.

11. A non-transitory computer readable recording medium recording an image data display program for causing a computer to execute:
a color information conversion procedure for converting measurement values into color information representative of a global distribution of the measurement values;
a detail extraction procedure for extracting, from the measurement values, detail information of the measurement values, wherein the detail extraction procedure assigns the measurement values to lightness and extracts a gradient of the assigned lightness as the detail information;
a detail adjustment procedure for adjusting a strength of the detail information to generate adjusted detail information;
a reconfiguration procedure for reconfiguring, based on the adjusted detail information, the lightness by integrating the gradient;
a color information adding procedure for adding, based on the adjusted detail information, the color information to the reconfigured lightness.

12. The non-transitory computer readable recording medium as claimed in claim 11, wherein the color information conversion procedure causes the computer to execute:
a pseudo-color generation procedure for generating, based on the measurement values, a pseudo-color for each pixel; and
a color information extraction procedure for extracting the color information from the pseudo-color.

13. The non-transitory computer readable recording medium as claimed in claim 11, wherein the reconfiguration procedure causes the computer to reconfigure, based on the color information and the adjusted detail information, the lightness so as to preserve the color information.

14. The non-transitory computer readable recording medium as claimed in claim 11,
wherein the image data display program further causes the computer to execute a measurement value adjustment procedure for converting the measurement values to more appropriate values to generate adjusted measurement values, and
wherein the color information conversion procedure causes the computer to convert the adjusted measurement values to the color information.

15. The non-transitory computer readable recording medium as claimed in claim 11,
wherein the image data display program further causes the computer to execute a brightness image input procedure for inputting a brightness image related to the measurement values, and
wherein the detail extraction procedure causes the computer to extract, based on the brightness image instead of the measurement values, detail information of the brightness image.

* * * * *